United States Patent
Tian et al.

(10) Patent No.: US 10,611,248 B2
(45) Date of Patent: Apr. 7, 2020

(54) ELECTRICAL SYSTEM FOR A VEHICLE WHICH CAN BE ELECTRICALLY DRIVEN

(71) Applicant: CONTINENTAL AUTOMOTIVE GMBH, Hannover (DE)

(72) Inventors: Qi Tian, Regensburg (DE); Florian Uhrig, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 574 days.

(21) Appl. No.: 15/512,748

(22) PCT Filed: Aug. 13, 2015

(86) PCT No.: PCT/EP2015/068704
§ 371 (c)(1),
(2) Date: Mar. 20, 2017

(87) PCT Pub. No.: WO2016/041711
PCT Pub. Date: Mar. 24, 2016

(65) Prior Publication Data
US 2017/0282723 A1    Oct. 5, 2017

(30) Foreign Application Priority Data
Sep. 18, 2014    (DE) .................... 10 2014 218 738

(51) Int. Cl.
*B60L 1/00*    (2006.01)
*B60L 3/00*    (2019.01)
(Continued)

(52) U.S. Cl.
CPC ............... *B60L 11/10* (2013.01); *B60L 50/14* (2019.02); *B60L 50/50* (2019.02); *B60L 50/51* (2019.02);
(Continued)

(58) Field of Classification Search
CPC .......... B60L 11/10; B60L 50/14; B60L 50/50; B60L 50/51; B60L 50/52; B60L 50/61;
(Continued)

(56) References Cited

U.S. PATENT DOCUMENTS

2006/0226703 A1    10/2006    Schreiber
2011/0050174 A1*    3/2011    King .................. B60L 53/20
                                                                320/134
(Continued)

FOREIGN PATENT DOCUMENTS

DE    102005021722 A1    5/2006
DE    102005016177 A1    10/2006
(Continued)

*Primary Examiner* — Rexford N Barnie
*Assistant Examiner* — Toan T Vu
(74) *Attorney, Agent, or Firm* — Laurence A. Greenberg; Werner H. Stemer; Ralph E. Locher

(57) ABSTRACT

An electrical system for a vehicle which can be electrically driven includes a high-voltage DC system and a low-voltage DC system. A DC/DC converter is, or can be, electrically connected to the high-voltage DC system at one end and to the low-voltage DC system at the other end. An AC line passage is, or can be, electrically connected to a first DC/AC converter. The first DC/AC converter is, or can be, electrically connected to the high-voltage DC system at one end and to an AC drive device of the vehicle by way of the AC line passage at the other end. There is also included a DC energy source, in particular a fuel cell device for example. A second DC/AC converter is, or can be, electrically connected to the DC energy source at one end and to the AC line passage at the other end.

9 Claims, 2 Drawing Sheets

(51) Int. Cl.
*H02G 3/00* (2006.01)
*B60L 11/10* (2006.01)
*B60L 58/30* (2019.01)
*B60L 50/51* (2019.01)
*B60L 50/61* (2019.01)
*B60L 50/52* (2019.01)
*B60L 50/14* (2019.01)
*B60L 53/24* (2019.01)
*B60L 50/50* (2019.01)
*B60L 53/14* (2019.01)

(52) U.S. Cl.
CPC ............... *B60L 50/52* (2019.02); *B60L 50/61* (2019.02); *B60L 53/14* (2019.02); *B60L 53/24* (2019.02); *B60L 58/30* (2019.02); *B60L 2210/10* (2013.01); *B60L 2210/30* (2013.01); *B60L 2210/40* (2013.01); *Y02T 10/6217* (2013.01); *Y02T 10/7072* (2013.01); *Y02T 10/7077* (2013.01); *Y02T 10/7216* (2013.01); *Y02T 10/7241* (2013.01); *Y02T 90/127* (2013.01); *Y02T 90/14* (2013.01); *Y02T 90/34* (2013.01)

(58) Field of Classification Search
CPC .......... B60L 53/14; B60L 53/24; B60L 58/30; B60L 2210/10; B60L 2210/30; B60L 2210/40; Y02T 10/6217; Y02T 10/7072; Y02T 10/7077; Y02T 10/7216; Y02T 10/7241; Y02T 90/127; Y02T 90/14; Y02T 90/34
USPC .... 307/9.1, 10.1; 429/9, 415, 429, 437, 434, 429/444; 320/101, 104, 118, 134; 318/139, 376, 440
See application file for complete search history.

(56) References Cited

U.S. PATENT DOCUMENTS

| | | | |
|---|---|---|---|
| 2012/0141895 A1* | 6/2012 | Kwon | H01M 8/04037 429/429 |
| 2013/0065089 A1 | 3/2013 | Kazuno et al. | |
| 2014/0239869 A1 | 8/2014 | Gorka et al. | |
| 2014/0265942 A1 | 9/2014 | Li et al. | |
| 2014/0368131 A1 | 12/2014 | Katsumata et al. | |
| 2015/0291051 A1* | 10/2015 | Morimoto | B60L 11/1862 307/10.1 |

FOREIGN PATENT DOCUMENTS

| | | |
|---|---|---|
| DE | 102010048673 A1 | 4/2012 |
| DE | 102012215943 A1 | 3/2013 |
| DE | 102011085731 A1 | 5/2013 |
| EP | 2777974 A2 | 9/2014 |
| EP | 2849308 A1 | 3/2015 |
| WO | 2013168491 A1 | 11/2013 |

* cited by examiner

ELECTRICAL SYSTEM FOR A VEHICLE WHICH CAN BE ELECTRICALLY DRIVEN

BACKGROUND OF THE INVENTION

Field of the Invention

The present invention relates to an electrical system for a vehicle which can be electrically driven, which includes:
- a high-voltage DC network (12a) with a high-voltage DC energy store (14a)
- a low-voltage DC network (16a) with a low-voltage DC energy store (18a),
- a DC/DC converter (20a), which is electrically connected or connectable on one side to the high-voltage DC network (12a) and on the other side to the low-voltage DC network (16a) in order to permit the transmission of electrical energy from the high-voltage DC network (12a) to the low-voltage DC network (16a) and/or vice versa,
- a first DC/AC converter (22a) and an AC line passage (24a) which is electrically connected or connectable thereto, wherein the first DC/AC converter (22a) is electrically connected or connectable on one side to the high-voltage DC network (12a), and on the other side, via the AC line passage (24a), to an AC drive device (26a) of the vehicle, in order to permit the transmission of electrical energy from the high-voltage DC network (12a) via the first DC/AC converter (22a) and further via the AC line passage (24a) to the AC drive device (26a), and preferably also vice versa.
- a DC energy source (28a), specifically a fuel cell device, for the generation of electrical energy for the supply of the electrical system (10a).

Electrical systems of this type, or vehicles equipped therewith, are well-known from the prior art. Specifically, systems of this type are known from the field of series hybrid vehicles.

In known systems and vehicles of this type, a high-voltage DC network with a typical nominal voltage of approximately 300 to 400 V, with comparatively low electrical losses, is used for a transmission of electrical energy from a high-voltage DC energy store via a DC/AC converter to an AC drive device (typically, a three-phase AC motor), thereby propelling the vehicle and, where applicable, for the transmission of electrical energy from the AC drive device via the (in this case bi-directionally configured) DC/AC converter to the high-voltage DC energy store, in order to brake the vehicle or recover braking energy.

By contrast, a low-voltage DC network of the system, with a typical nominal voltage of e.g. 12 V, constitutes a network of relatively modest requirements in respect of the complexity of electrical insulation for the supply of consumers on the vehicle with comparatively low electrical power consumption, such as e.g. vehicle electronics, lighting systems, signaling devices, mechatronic devices, etc.

Advantageously, these two networks of different nominal voltage are mutually coupled by means of a DC/DC converter (e.g. in a bi-directional configuration) such that, where required, electrical energy can be transmitted from one network to the other network.

Finally, the known system comprises, for example, a fuel cell device (or alternatively, for example, a combustion engine with an electric generator driven thereby) for the generation of electrical energy for the supply of the electrical system, wherein the fuel cell device is coupled to the high-voltage DC network via a further DC/DC converter, in order to permit the transmission of electrical energy generated by the fuel cell device to the high-voltage DC network via this further DC/DC converter.

Finally, a further DC/AC converter is customarily provided, in order to transmit external electrical energy (e.g. from an AC grid system) sourced from a charger connection device of the vehicle to the high-voltage DC network or to the high-voltage DC energy store coupled to said network.

The aforementioned design of a known electrical system thus comprises two DC/DC converters and two DC/AC converters. This results in a comparatively high weight and extensive spatial requirements.

SUMMARY OF THE INVENTION

An object of the present invention is the simplification of an electrical system of the aforementioned type, without the need to accept impairments in the functionality of the system.

On the basis of an electrical system of the aforementioned type, this object is fulfilled according to the invention, in that the electrical system moreover comprises a second DC/AC converter which is electrically connected or connectable on one side to the DC energy source and on the other side to the AC line passage, in order to permit the transmission of electrical energy generated by the DC energy source via the second DC/AC converter, and moreover via the first DC/AC converter to the high-voltage DC network and/or to permit the transmission of electrical energy generated by the DC energy source via the second DC/AC converter, and moreover to the AC drive device.

According to a fundamental concept of the invention, rather than the customary provision of a further DC/DC converter for the connection of the DC energy source to the high-voltage DC network, a DC/AC conversion of the energy generated by the DC energy source is provided, which energy is then be transmitted to the AC line passage.

This provides a direct advantage, for example, in that energy generated by the DC energy source is available as drive power for the vehicle after only one DC/AC conversion, and thus in a comparatively efficient manner (in comparison with the two-fold conversion associated with the prior art). Moreover, directly because of this, the option is still available to employ energy generated by the DC energy source for the recharging of the high-voltage DC energy store, wherein energy transmitted to the AC line passage is further transmitted to the high-voltage DC network via the DC/AC converter, which is present in any event.

By a connection of the two DC/AC converters provided according to the invention, the functionality of the further DC/DC converter employed at this point in the prior art can be achieved. By this arrangement, the known further DC/DC converter, and the electrical losses associated therewith for the connection of the DC energy source and the high-voltage DC network, can be omitted. Instead, the DC energy source can be connected to the high-voltage DC network via a "virtual DC/DC converter" (a series-connected arrangement of two DC/AC converters).

Moreover, the architecture of the electrical system according to the invention offers further cost-saving and weight-/space-saving potential.

In one form of embodiment, the vehicle is a fuel cell vehicle, in which a fuel cell device (incorporating a hydrogen reservoir or tank) is provided as a DC energy source, wherein the energy generated by the latter is available for the propulsion of the vehicle, by means of the AC drive device.

In another form of embodiment, the DC energy source is provided e.g. in the form of a combination of a combustion engine, e.g. a petrol engine or diesel engine (incorporating a fuel reservoir or tank) and an electric generator which is drivable by the combustion engine.

In one form of embodiment, the vehicle is a "pure" series hybrid vehicle.

In both of the aforementioned variants, the vehicle can be described as a series hybrid vehicle, in that it comprises a plurality of energy converters which are exploitable for the purposes of propulsion (the electrical AC drive device and the DC energy source), only one of which (the electrical AC drive device) is employed for the direct mechanical propulsion of the vehicle, whereas the other energy converter (e.g. the fuel cell device or the combustion engine in combination with an electric generator) have no such mechanical connection to a drive shaft or similar.

Within the meaning of the invention, the terms "high-voltage" and "low-voltage" are to be understood in that the relevant nominal electrical voltages (DC voltage or peak AC voltage) differ by a very substantial margin, specifically by a factor of more than 3, and specifically by a factor of more than 5.

In one form of embodiment, it is provided that the high-voltage DC network is rated for a nominal service voltage of no less than 300 V. This voltage can lie e.g. within a range of 300 to 400 V.

In one form of embodiment, it is provided that the low-voltage DC network is rated for a nominal service voltage not exceeding 120 V, and specifically not exceeding 24 V. This voltage can be e.g. 12 V.

In one form of embodiment, the DC/DC converter has a bi-directional configuration, and thus permits a transmission of energy, both from the low-voltage DC network to the high-voltage DC network and in the reverse direction, i.e. from the high-voltage DC network to the low-voltage DC network.

Preferably, the first DC/AC converter also has a bi-directional configuration, in particular as this firstly thus permits an advantageous recovery of braking energy, and secondly, in combination with the second DC/AC converter, permits a recharging of the high-voltage DC energy store from the DC energy source.

In one form of embodiment, it is provided that the AC line passage is configured as 3-pole, three-phase AC line passage.

In one form of embodiment, it is provided that the DC energy source comprises a fuel cell device, or is constituted by such a device. For this purpose, e.g. a combustion engine, with an electric generator which is drivable by the latter, can also be employed. In these cases, specifically, a uni-directional configuration of the second DC/AC converter suffices.

In one form of embodiment, the electrical system moreover comprises a (preferably program-controlled) electronic control device for the control of the aforementioned energy transmission processes.

Specifically, this control device, in response to user requirements, can control the first DC/AC converter for a drive mode or a recovery mode, as required. In the first case, the DC/AC converter functions as an inverter for the actuation of the electric drive device, and in the second case as a rectifier for the recovery of energy in the high-voltage DC network (recovery mode).

In a corresponding manner, the control device can specifically also control the DC/DC converter and/or the second DC/AC converter.

The aforementioned control device can be provided as a central control device for the vehicle whereby, moreover, control units optionally and locally configured on or in the components to be controlled may be present, which cooperate with an overriding central control device of this type. An example of this arrangement is, e.g. a control unit, arranged within a high-voltage DC energy storage system, for the delivery of a local sensor technology function (e.g. for the detection of a state of charge, etc.) and for the execution of local control functions, which communicates with an overriding central control device.

In a preferred form of embodiment, the electrical system moreover comprises a first controllable switching device for the controllable connection and disconnection of the AC drive device and the AC line passage.

The separability of the AC drive device thus provided, for example controlled by the aforementioned electronic control device, has the advantage that electrical energy generated by the DC energy source can be transmitted via the AC line passage to the high-voltage DC network (e.g. for the recharging of the high-voltage DC energy store of a parked vehicle), without the unintentional energization of the AC drive device. A connection of the AC drive device to the AC line passage is then provided by means of the first controllable switching device, if the operation of the AC drive device is required, whether in a drive mode or in recovery mode.

In drive mode, for the energization of the AC drive device, both energy transmitted from the high-voltage DC network via the first DC/AC converter and energy generated by the DC energy source and transmitted via the second DC/AC converter can advantageously be employed.

In a preferred form of embodiment, the electrical system moreover comprises a second controllable switching device for the controllable connection and disconnection of the DC energy source and the AC line passage. This switching device can be arranged between the DC energy source and the second DC/AC converter, or between the second DC/AC converter and the AC line passage.

It is thus possible, in a simple manner, to decouple the energy transmission from the DC energy source, as required, from the remainder of the system. This function can also be controlled e.g. by means of the aforementioned control device.

In a preferred further development of the invention, the electrical system moreover comprises a charger connection device which is connected or connectable to the AC line passage.

The function of a charger connection device of this type (e.g. a socket-contact device, specifically e.g. for a (e.g. 3-pole) three-phase AC connector, is to permit a recharging of the energy storage components of the system in a parked vehicle from an external electrical grid system (e.g. a three-phase AC network). In the above proposed further development, externally-sourced electrical energy fed via the charger connection device can be transmitted via the first DC/AC converter for the recharging of the high-voltage DC energy store.

Specifically when the aforementioned first and second controllable switching devices are present, the charger connection device can be permanently connected to the AC line passage, with no problem.

This further development has a major advantage in that, for the purposes of this recharging option, no dedicated AC/DC converter is required, but the first DC/AC converter (subject to the bi-directional configuration thereof), which is present in any event, can also be advantageously used for this purpose. The number of converters required in the electrical system can thus be advantageously reduced.

The invention can advantageously be employed e.g. in a fuel cell vehicle, e.g. a fuel cell series hybrid vehicle.

BRIEF DESCRIPTION OF THE SEVERAL VIEWS OF THE DRAWING

The invention is further described hereinafter on the basis of exemplary embodiments, with reference to the attached drawings. Herein.

DESCRIPTION OF THE INVENTION

Figure 1:
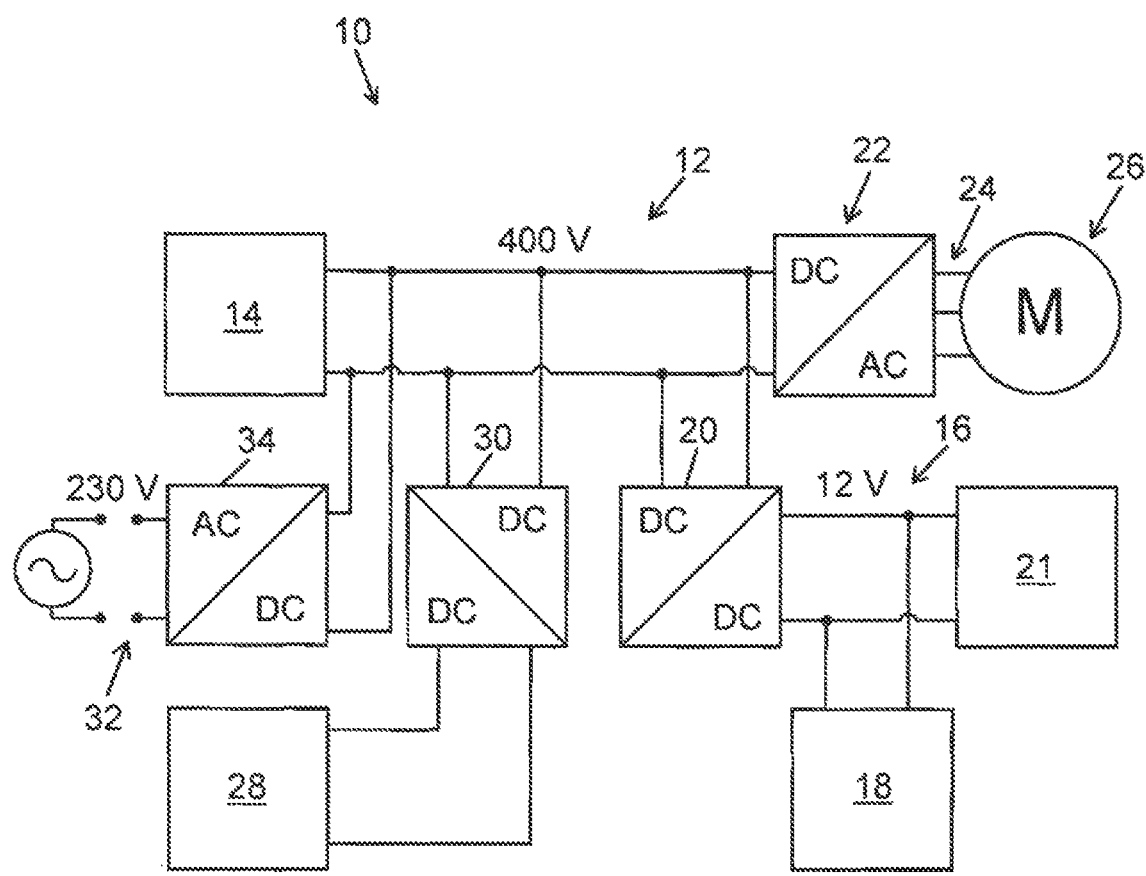
FIG. 1 shows a block diagram for the illustration of the electrical system of a fuel cell vehicle of the conventional type.

For the purposes of the understanding of the invention, FIG. 1 represents the key components of an electrical system 10 of conventional design for a vehicle which can be electrically driven.

The system 10 comprises a high-voltage DC network 12 with a high-voltage DC energy store 14. In the exemplary embodiment represented, the high-voltage DC network 12 is formed of a two-pole conductor arrangement with a nominal service voltage of e.g. 400 V. In the example represented, the high-voltage DC energy store 14 comprises a lithium-ion accumulator.

The system 10 moreover comprises a low-voltage DC network 16 (in this case with a nominal voltage of e.g. 12 V), with a low-voltage DC energy store 18 (in this case e.g. a lead-acid accumulator) connected thereto. The function of the network 16 is the supply of consumers 21.

In order to permit the exchange of electrical energy between the two on-board networks 12, 16 as required, these networks 12, 16 are electrically interconnected by means of a bi-directional DC/DC converter 20.

The high-voltage DC network 12 is moreover electrically connected to the DC side of a DC/AC converter 22, the AC side of which, via a three-pole AC line passage 24 (three-phase AC line), is electrically connected to an electrical AC drive device 26 (in this case e.g. a three-phase AC motor).

For the electrical propulsion of the vehicle, the DC/AC converter 22, in a conventional manner, is controlled by an (unrepresented) control device to operate as an inverter, for the inversion of the network-side DC voltage and the output-side delivery of a corresponding AC voltage to the AC drive device 26 via the AC line passage 24.

For operation in recovery mode, e.g. for a recovery of the braking energy of the vehicle, the DC/AC converter 22 is operated in the reverse direction, for the rectification of an AC voltage induced in the AC drive device, which AC voltage is then employed for the recharging of the high-voltage DC energy store.

The system 10 moreover comprises a DC energy source 28, in this case in the form of a fuel cell device, for the generation of electrical energy for the supply of the system 10. The DC energy source 28 is electrically connected to the high-voltage DC network 12 via a further DC/DC converter 30. By means of the (uni-directionally configured) DC/DC converter 30, energy generated by the DC energy source can thus be transmitted to the high-voltage DC network 12.

Finally, the system 10 comprises a charger connection device 32, in this case e.g. a two-pole socket-contact device, which is electrically connected to the high-voltage DC network 12 via an AC/DC converter 34, in order to permit a recharging of the high-voltage DC energy store 14 from an external AC grid system, when the vehicle is parked.

The known design illustrated in FIG. 1 has a comparatively high weight and a high spatial requirement.

Hereinafter, with reference to FIG. 2, an electrical system of simplified design is described for a vehicle which can be electrically driven, which nevertheless delivers the same functionalities as the system 10 represented in FIG. 1.

In the following description of an exemplary embodiment according to the invention, components of equivalent function are identified by the same reference numbers, but with the addition of a lower case "a" in each case, for the purposes of the distinction of this form of embodiment. Essentially, only differences from the exemplary embodiment already described are addressed and, to this end, specific reference is moreover included to this aforementioned exemplary embodiment.

Figure 2:
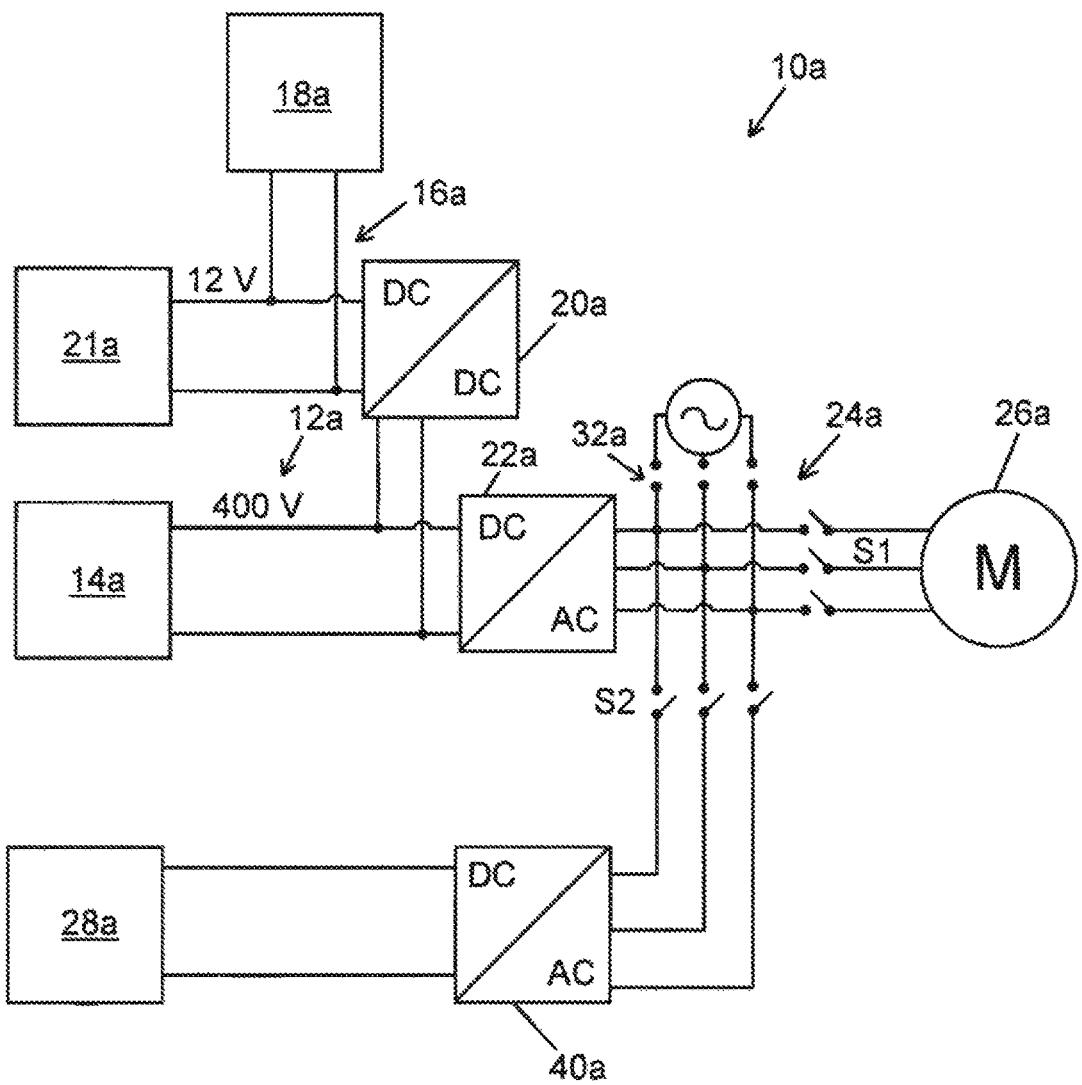
FIG. 2 shows a block diagram of the electrical system of a fuel cell vehicle according to an exemplary embodiment of the invention.

FIG. 2 represents the components of an electrical system 10a for a fuel cell vehicle.

The system 10a comprises a high-voltage DC network 12a with a high-voltage DC energy store 14a. In the exemplary embodiment represented, the high-voltage DC network 12a is formed of a two-pole conductor arrangement with a nominal service voltage of e.g. 400 V. The high-voltage DC energy store 14a comprises a lithium-ion accumulator.

The system 10a moreover comprises a low-voltage DC network 16a (with a nominal voltage of e.g. 12 V), with a low-voltage DC energy store 18a (in this case e.g. a lead-acid accumulator) connected thereto.

In order to permit the exchange of electrical energy between the two on-board networks 12a, 16a as required, these networks 12a, 16a are electrically interconnected by means of a bi-directionally configured DC/DC converter 20a.

The high-voltage DC network 12a is moreover connected via a first DC/AC converter 22a to an AC line passage 24a which, in the example represented, is configured as a three-pole three-phase AC line passage.

The AC line passage 24a is routed to an electrical AC drive device 26a (in this case e.g. a three-phase AC motor).

The electrical propulsion of the vehicle, and an operation in recovery mode, can thus be executed in the manner described above for the known system 10 with reference to FIG. 1.

By distinction from the known system 10, the system according to the invention 10a has the following specific features:

In order to make the energy generated by a DC energy source 28a (in this case e.g. a fuel cell device, wherein alternatively e.g. a combustion engine in combination with an electric generator is also possible) available for use by the system 10a, a second DC/AC converter 40a is provided, which is electrically connected on one side (the DC side) to the DC energy source 28a, and on the other side (the AC side) to the AC line passage 24a.

It is thus possible to transmit electrical energy generated by the DC energy source 28a via the second DC/AC converter 40a, and moreover via the first DC/AC converter 22a to the high-voltage DC network 12a. Alternatively or additionally, it is possible for such electrical energy generated by the DC energy source 28a to be transmitted via the second DC/AC converter 40a and the AC line passage 24a to the AC drive device 26a.

A further specific feature of the system 10a is provided, in that a first controllable switching device S1 for the controllable connection of the AC drive device 26a to the AC line passage 24a and the disconnection of the AC drive device 26a from the AC line passage 24a, and a second controllable switching device S2 for the controllable connection of the DC energy source 28a to the AC line passage 24a and the disconnection of the DC energy source 28a from the AC line passage 24a, are provided.

A further specific feature of the system 10a is provided, in that a charger connection device 32a is connected to the AC line passage 24a.

The electrical system 10a according to the invention constitutes an optimization of the entire electrical architecture of the vehicle. Specifically, this involves optimization by a reduction of components, with no resulting impairment of functionality. Specifically, by the electrical connection of the two DC/AC converters 22a, 40a, the functionality of the additional DC/DC converter provided according to the prior art can be achieved. This permits the omission of the DC/DC converter for the connection of the DC energy source 28a ("range extender") and the electrical energy store. During driving, the high-voltage DC energy store 14a and the DC energy source 28a (fuel cells) can simultaneously be employed, in a highly efficient manner, as an energy source for vehicle propulsion. In the system 10a according to the invention, a dedicated AC/DC converter for the provision of an external recharging facility can also be omitted.

The vehicle states or operating modes which are achievable e.g. by means of a program-controlled electronic control device, by the corresponding control of the various converters and switching devices, are further summarized in the following table.

| Vehicle state: | First DC/AC converter: | Second DC/AC converter: | Switching device S1: | Switching device S2: |
|---|---|---|---|---|
| Driving (propulsion) | DC/AC conversion | DC/AC conversion | closed | open or closed |
| Braking (recovery) | AC/DC conversion | not employed | closed | open |
| Charging from an external grid system | AC/DC conversion | not employed | open | open |
| Charging from DC energy source (e.g. fuel cells) | DC/AC conversion | AC/DC conversion | closed or open | closed |

In the "driving (propulsion)" state, with the switching device S2 closed, energy from the DC energy source can be employed.

In the "charging from DC energy source" state, with the switching device S1 closed, energy from the DC energy source can simultaneously be employed for the propulsion of the vehicle.

The invention claimed is:

1. An electrical system for a vehicle which can be electrically driven, the electrical system comprising:

a high-voltage DC network with a high-voltage DC energy storage device;

a low-voltage DC network with a low-voltage DC energy storage device;

a DC/DC converter having a first side electrically connected or connectable to said high-voltage DC network and a second side connected or connectable to said low-voltage DC network in order to permit the transmission of electrical energy from said high-voltage DC network to said low-voltage DC network and/or vice versa;

a first DC/AC converter and an AC line passage electrically connected or connectable to said first DC/AC converter, said first DC/AC converter having a first side electrically connected or connectable to said high-voltage DC network, and a second side connected, via said AC line passage, to an AC drive device of the vehicle, for permitting a transmission of electrical energy between said high-voltage DC network and said AC drive device via said first DC/AC converter and via said AC line passage;

a DC energy source for generating electrical energy for supplying the electrical system;

a second DC/AC converter having a first side electrically connected or connectable to said DC energy source and a second side connected or connectable to said AC line passage, in order to permit a transmission of electrical energy generated by said DC energy source via said second DC/AC converter and further via said first DC/AC converter to said high-voltage DC network and/or to permit a transmission of electrical energy generated by said DC energy source via said second DC/AC converter to the AC drive device of the vehicle.

2. The electrical system according to claim 1, wherein said high-voltage DC network is rated for a nominal service voltage of no less than 300 V.

3. The electrical system according to claim 1, wherein said low-voltage DC network is rated for a nominal service voltage not exceeding 120 V.

4. The electrical system according to claim 3, wherein said low-voltage DC network is rated for a nominal service voltage not exceeding 24 V.

5. The electrical system according to claim 1, wherein said DC energy source comprises a fuel cell device.

6. The electrical system according to claim 1, further comprising a first controllable switching device for the controllable connection and disconnection between the AC drive device and said AC line passage.

7. The electrical system according to claim 6, further comprising a second controllable switching device for the controllable connection and disconnection between said DC energy source and said AC line passage.

8. The electrical system according to claim 1, further comprising a charger connection device connected or connectable to said AC line passage.

9. A vehicle which can be electrically driven, comprising an electrical system according to claim 1.

* * * * *